United States Patent [19]

Fuller et al.

[11] Patent Number: 5,052,096
[45] Date of Patent: Oct. 1, 1991

[54] GROMMET INSERTION METHOD AND APPARATUS

[75] Inventors: Jack J. Fuller; Joseph A. Podesta; Daniel J. Yarnold, all of Memphis, Tenn.

[73] Assignee: Carrier Corporation, Syracuse, N.Y.

[21] Appl. No.: 248,057

[22] Filed: Sep. 23, 1988

[51] Int. Cl.[5] .............................................. B23P 11/02
[52] U.S. Cl. ...................................... 29/451; 29/453; 29/525; 29/525.2
[58] Field of Search ................. 29/446, 451, 453, 525, 29/525.1, 525.2

[56] References Cited

U.S. PATENT DOCUMENTS

| | | | |
|---|---|---|---|
| 2,148,401 | 2/1939 | Ellis, Jr. | 29/453 |
| 2,357,139 | 8/1944 | Seme | 29/453 |
| 2,876,485 | 3/1959 | Cowles | 29/525.1 X |
| 3,016,562 | 1/1962 | Reid | 29/451 |
| 3,090,115 | 5/1963 | Carr | 29/453 X |
| 4,183,132 | 1/1980 | Nagashima et al. | 29/451 |
| 4,203,191 | 5/1980 | Gibson, Sr. | 29/453 X |

Primary Examiner—Mark Rosenbaum
Assistant Examiner—Frances Chin

[57] ABSTRACT

Apparatus is provided for the automated insertion of elastomeric grommets in the legs of a compressor base. The holes in each of the compressor legs are aligned with respective discharge ends of guide cylinders which function to receive the grommets and to force them upwardly through a converging portion thereof to deform a head portion sufficiently such that it passes through the compressor leg hole and is then allowed to spring back to its original shape to secure the grommet within the hole. Provision is also made for assisting the removal of the remaining portion of the grommet from the guide cylinder by a push rod which engages the base of the compressor at the same time that the grommet head passes through the leg opening, such that the entire compressor is moved upwardly to pull the grommet body from the converging portion of the guide cylinders.

10 Claims, 3 Drawing Sheets

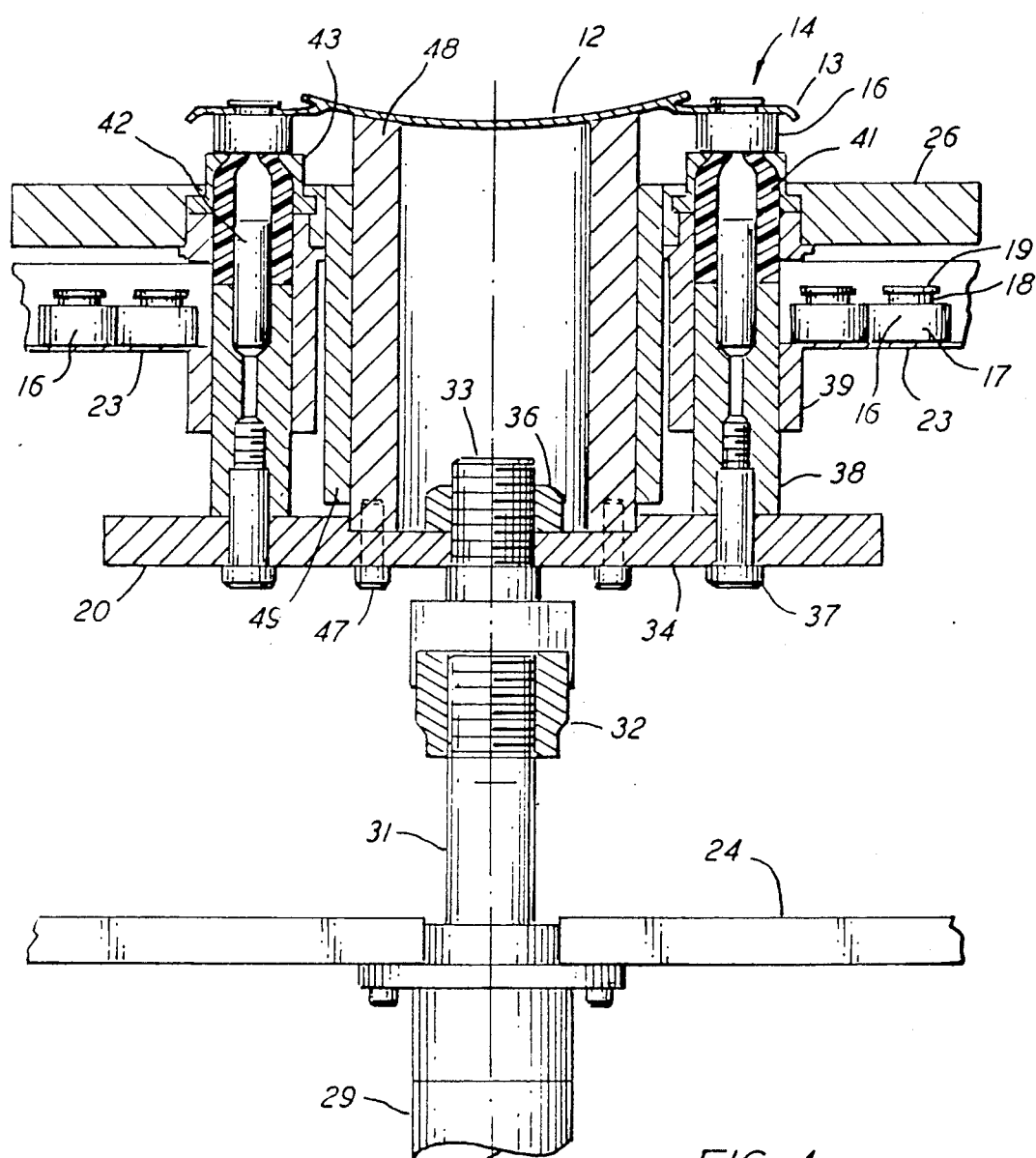
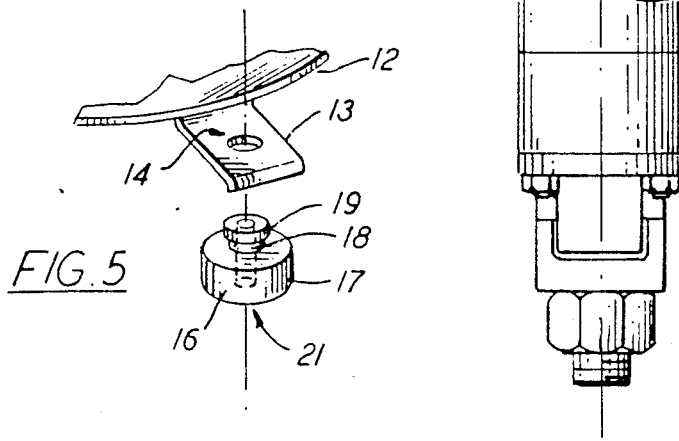
FIG. 4
FIG. 5

GROMMET INSERTION METHOD AND APPARATUS

BACKGROUND OF THE INVENTION

This invention relates generally to a compressor assembly process and, more particularly, to a method and apparatus for installing elastomeric grommets in the base of a compressor.

It is customary in the design of air conditioning systems to mount the refrigerant compressor to the base pan of the condensing or outdoor unit. In such an installation, it is desirable to dampen the vibrations that are caused by operation of the compressor. This is generally accomplished with elastomeric grommets that are placed between the base of the compressor and the base pan to which it is mounted. Since the mounting bolts can also act to transfer these vibrations to the base pan, it is preferable that the elastomeric grommets pass through the openings in the base of the compressor and include a collar or head on the upper end thereof such that when the mounting bolts are placed through the center of the grommets, the head of the mounting bolts rests on the elastomeric collar of the grommet. In this way, the compressor is entirely isolated from any metal-to-metal connection between the compressor base and the base pan.

Heretofore, elastomeric grommets were manually inserted into the mounting holes of the compressor base assembly. This was recognized as being labor intensive and a time consuming process, since only a single grommet was installed at a time. Further, when performed in this manner, the process tends to be arduous for the installer since the grommets are preferably sized so as to have a tight fit relationship within the compressor base.

It is therefore an object of the present invention to provide an improved method and apparatus for the installation of elastomeric grommets into compressor base openings.

Another object of the present invention is the provision for reducing the time that is required for installing elastomeric grommets into compressor base openings.

Yet, another object of the present invention is the provision for a method and apparatus for installing grommets into compressor base openings in an automated fashion. p Still another object of the present invention is the provision for installing elastomeric grommets into a compressor base opening in an economical and efficient manner.

These objects and other features and advantages become more readily apparent upon reference to the following description when taken in conjunction with the appended drawings.

SUMMARY OF THE INVENTION

Briefly, in accordance with an aspect of the invention, the compressor base is placed over one end of a guide cylinder, with its opening in axial alignment with a discharge opening of the cylinder. Provision is made to insert an elastomeric grommet into the cylinder, with its head toward the discharge end. A piston is then made to move upwardly into the cylinder so as to engage the bottom of the grommet and force it upwardly into a contracting portion wherein the grommet head is deformed so as to allow its entry first into the diminished cylinder discharge opening and then through the compressor base opening, after which the head expands to its undeformed condition to thereby capture the grommet in the base opening.

By another aspect of the invention, a push rod is caused to engage the compressor base, at substantially the same time that the grommet head emerges through the compressor base opening, such that continued movement of the push rod against the compressor base causes the compressor base to be lifted from the guide cylinder and to thereby assist the piston in forcing the remaining portion of the elastomeric grommet through the converging and discharge opening portions of the cylinder.

In accordance with another aspect of the invention, the grommets are fed, one by one, into the cylinder by way of a side chute, with the grommets entering in a direction normal to the cylinder axis, and with their heads oriented in the desired upward direction. The piston is in a retracted position below the chute when the grommet enters the cylinder, and then moves upwardly to engage the grommet and force it upwardly within the cylinder.

By yet another aspect of the invention, a plurality of cylinders are provided so as to simultaneously install a plurality of grommets in their associated compressor base openings. The pistons are attached to a common pusher plate so as to be moved in unison. Further, the pusher plate is also attached to the push rod so as to synchronize the piston movement with the push rod movement.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 4 is a front sectional view thereof with the piston assembly being in the raised position.

FIG. 5 is a segmented perspective view of the grommet and its associated compressor base leg.

DESCRIPTION OF THE PREFERRED EMBODIMENT

Figure 1:
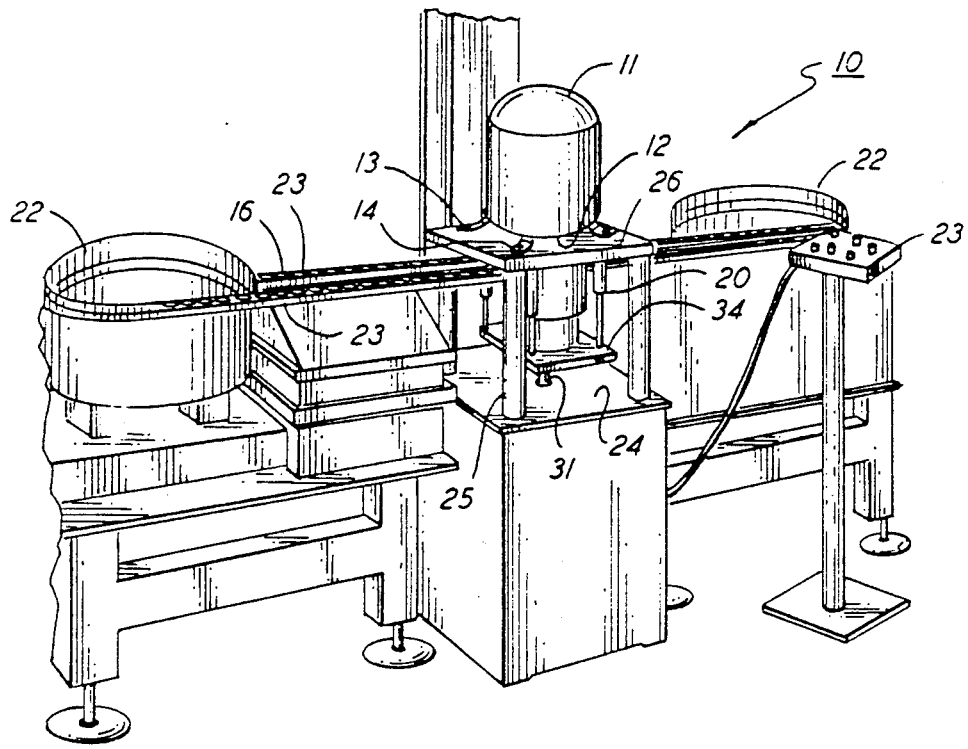
FIG. 1 is a perspective view of the apparatus of the present invention.

Referring now to FIG. 1, the invention is shown generally at 10 as applied to a compressor 11 having a base 12 with a plurality of outwardly extending legs 13 with each having an opening or mounting hole 14 formed therein. The apparatus is useful for simultaneously installing elastomeric grommets 16 in each of the mounting holes 14 in an automated fashion.

The grommet 16, which is shown in FIGS. 1-5, has a body 17, a neck 18, and a head 19 as will be seen in FIG. 5. A cylindrical bore 21 is formed at an axis for receiving a mounting bolt (not shown) therein. When installed, the grommet is inserted into the leg 13, with the body 17 below, the neck 18 within the opening 14, and the head 19 above the leg 13. The mounting bolt then passes through the bore 21 and the leg 13 where it is attached to the base pan of the system.

Referring again to FIG. 1, a pair of tumbler hoppers 22 on either side of the grommet insertion machine are provided to systematically orient and feed the grommets into four chutes 23 where they are conveyed on a somewhat continuous basis toward the grommet insertion machine 20 in an upright disposition. The grommet insertion machine 20 has a base platform 24, a plurality of connecting posts 25, and a top platform 26, with the operational portion of the grommet insertion machine 20 being disposed between the bottom platform 24 and the top platform 26, and the compressor 11 being temporarily placed with its legs 13 on the top platform 26 as shown. The grommet insertion machine 20 is controlled by an operator from the control stand 28 shown in FIG. 1.

Figure 3:
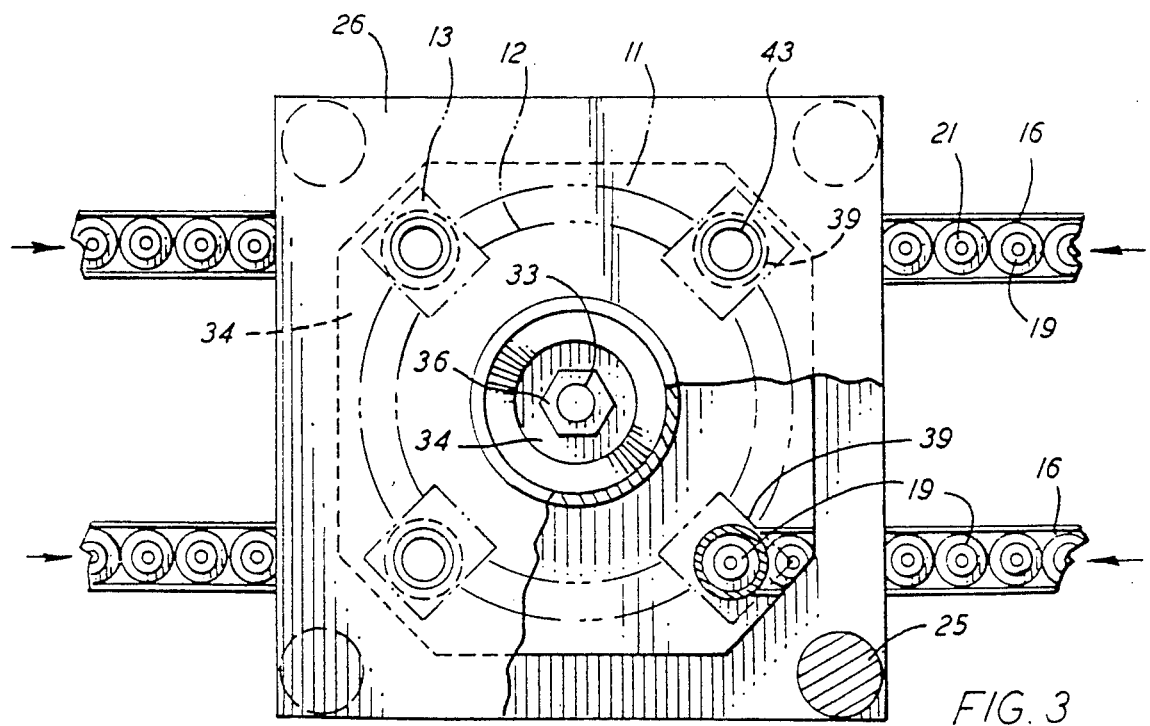
FIG. 3 is a top view thereof with a portion broken away to show structural detail.

Referring now to a grommet insertion machine 20 portion of the apparatus, as shown in detail in FIGS. 2, 3, and 4, there is provided below the bottom platform 24, a hydraulic cylinder 29 with an upwardly extending piston 31 with its associated coupling 32 and shaft 33. The shaft 33 is rigidly connected to a pusher plate 34 by a nut 36. Attached to the pusher plate 34 by bolts 37 are four plungers 38 that cooperate with associated guide cylinders 39, which are rigidly mounted to the top platform 26 for slideably receiving the plungers 38 and their plunger extensions 41 therein. The plunger extensions 41 are rigidly linked to the plungers 38 by way of central connecting shafts 42. The plunger extensions 41 are preferably made of a flexible low frictional material, and the inner walls of the guide cylinders 39 are preferably polished to minimize the friction in the sliding contact between the two elements.

At the top of each of the guide cylinders 39 is a grommet funnel 43 whose inner diameter converges from one which is slightly larger than the outer diameter of the plunger extensions 41 to that of a substantially smaller discharge opening 44. It is this component which functions to deform the grommet head 19 sufficiently for insertion into the compressor legs 13 when they are placed on top of the grommet funnel 43 with their mounting holes 14 registering with the associated discharge openings 44 as shown in FIG. 2.

Formed in the sides of each of the guide cylinders 39 is a side opening 46 which registers with the respective chutes 23 for sequentially receiving the individual grommets 16 into the respective guide cylinders. In FIG. 2, the piston 31 is shown in the fully downward position such that the pusher plate 34 and the associated plungers 38 are also in their fully downward positions. The plunger extensions 41 are therefore below the side openings 46, thus allowing the grommets 16 to be inserted into the guide cylinders 39. After the grommets have been inserted into the guide cylinders 39, the plungers 38 push them upwardly into the respective grommet funnels 43, where the grommet heads 19 are deformed to the smaller size of the discharge openings 44 so that they can easily fit into the mounting holes 14 of the compressor base legs 13. At that point, the plunger extensions 41 continue to move upwardly in the cylinders 39, being somewhat temporarily deformed themselves in the process, to push the body portions 17 of the grommet 16 through the converging grommet funnels 43 until they have passed entirely therethrough, at which point they are secure within the compressor base legs 13 and free from the grommet insertion machine. To assist in this latter portion of the process, a further structure is included as follows.

Also attached to the pusher plate 34 by a plurality of bolts 47 is a central inner cylinder or guide rod 48 which extends upwardly and is slideably received in a central outer cylinder 49 which is supported by the top platform 26. The mating cylinders tend to maintain the position of the pusher plate 34 with respect to the top platform 26, and also to assist in the disengaging portion of the grommet insertion process which will now be described.

Figure 2:
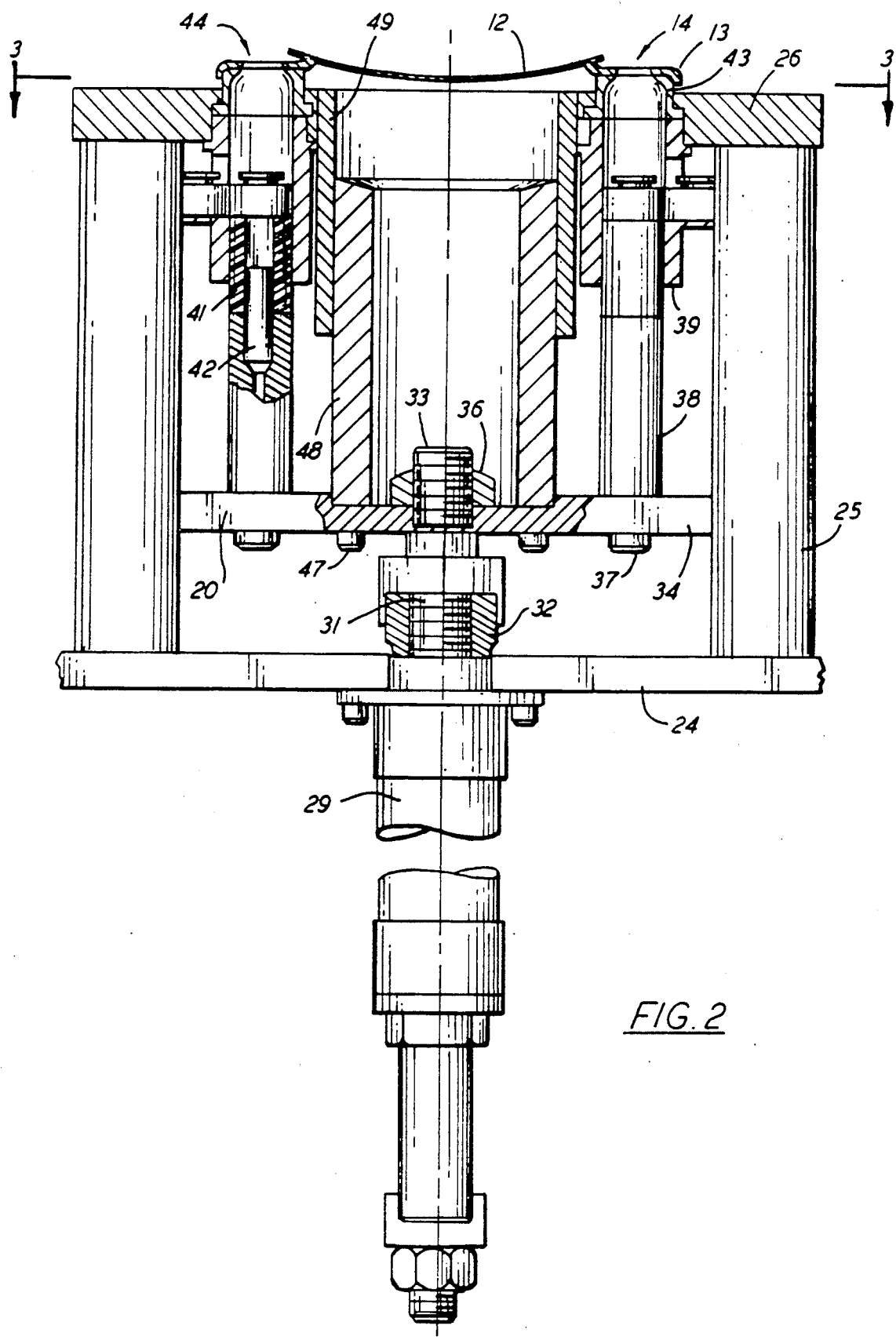
FIG. 2 is a front view of the grommet insertion portion thereof, with portions broken away to show structural detail.

The compressor is first placed with its four mounting legs 13 resting on the respective grommet funnels 43 as shown in FIG. 2. The grommets are advanced from the individual chutes 23 into the respective guide cylinders 39. The grommets 16 are then forced upwardly as described hereinabove, until the head 19 of the grommet passes through the hole 14 in the compressor base leg 13. At that point, the pusher rod 48 is at the point where its end engages the base 12 of the compressor 11 so that the compressor is lifted upwardly to thereby pull upwardly on the grommet head 19 and assist in pulling the body 17 thereof through the grommet funnels 43. The grommet insertion process is then complete as shown in FIG. 4, and the compressor is removed and the pusher plate 34 is again retracted to the position shown in FIG. 2 to commence the next cycle.

While the present invention has been disclosed with particular reference to a preferred embodiment, the concepts of this invention are readily adaptable to other embodiments, and those skilled in the art may vary the structure thereof without departing from the essential spirit of the present invention. For example, while the invention has been described in terms of apparatus having four upwardly extending guide cylinders and a central push rod, it may as well take other forms such as different numbers of horizontally disposed guide cylinders with or without a central push rod. Other variations will also occur to those skilled in the art, and it is contemplated that such variations are within the scope of the appended claims.

What is claimed:

1. A method of installing a grommet into a fixed size opening of a base structure comprising the steps of:
   providing an elastomeric grommet, having serially connected body, neck, and head portions;
   feeding said grommet into a cylinder having serially connected receiving, contracting, and discharge opening sections, with said receiving section having a diameter which is slightly larger than that of said grommet body and said discharge opening section having a diameter which is smaller than that of said grommet head when in a non-deformed condition;
   placing one side of said base structure against said cylinder discharge opening such that its opening overlays said cylinder discharge opening; and
   deforming said grommet head portion by pushing it through said contracting section and, while deformed, further pushing it through said discharge opening and said base structure opening before allowing it to return to its undeformed shape as it emerges n the other side of said base structure such that the grommet is captured in said base structure opening with its head on one side thereof, its body on the other side thereof, and its neck disposed therein.

2. A method as set forth in claim 1 wherein said feeding step is accomplished by inserting said grommet through a side opening in said cylinder, along a path which is in a direction substantially normal to the axis of said cylinder.

3. The method as set forth in claim 1 and including the step of aligning said grommet in a chute prior to its entering into said cylinder, with its axis substantially parallel to that of said cylinder.

4. The method as set forth in claim 1 wherein said grommet pushing step is accomplished by movement of a piston within said cylinder to engage the bottom of said grommet body and force it toward said cylinder discharge opening.

5. The method as set forth in claim 1 wherein said base structure has a plurality of openings and wherein the steps are performed simultaneously at each opening with the use of a plurality of grommet and cylinders.

6. The method as set forth in claim 5 wherein said plurality of cylinders are substantially parallel and further wherein a common pushing element is moved along an axis parallel thereto to push in unison said plurality of grommets within their respective cylinders.

7. A method of installing an elastomeric grommet into a fixed size opening of a base structure comprising the steps of:
    providing an elastomeric grommet, having serially connected body, neck, and head portions;
    feeding said grommet into a cylinder having serially connected receiving, contracting, and discharge opening sections, with said receiving section having a diameter which is slightly larger than that of said grommet body and said discharge opening section having a diameter which is smaller than that of said grommet head when in a non-deformed condition;
    placing one side of said base structure against said cylinder discharge opening such that its opening overlays said cylinder discharge opening;
    deforming said grommet head portion by pushing it through said contracting section and, while deformed, further pushing it through said discharge opening and said base structure opening before allowing it to return to its undeformed shape as it emerges on the other side of said base structure such that the grommet is captured in said base structure opening with its head on one side thereof, its body on the other side thereof, and its neck disposed therein; and
    lifting the base structure from said cylinder discharge opening by moving a push rod into engagement with said base structure one side, at substantially the same time that said grommet head emerges on said base structure other side.

8. The method as set forth in claim 7 and including the step of continuing to move said push rod and engaged base structure until said grommet body has passed through said cylinder contracting and discharge opening sections.

9. The method as set forth in claim 7 wherein the step of moving the push rod is accomplished in unison with the step of forcing the grommet head portion through said contracting and discharge opening sections.

10. A method of simultaneously installing a plurality of elastomeric grommets into a plurality of fixed size openings of a base structure comprising the steps of:
    providing elastomeric grommets, having serially connected body, neck, and head portions;
    feeding said grommets into respective parallel cylinders having serially connected receiving, contracting, and discharge opening sections, with said receiving sections having diameters which are slightly larger than those of said grommet bodies and said discharge opening sections having diameters which are smaller than those of said grommet heads when in a non-deformed condition;
    placing one side of said base structure against said cylinder discharge openings such that its openings overlay said cylinder discharge openings;
    deforming said grommet head portions by simultaneously pushing them with a common pushing element through said contracting sections and, while deformed, further pushing them through said discharge openings and said base structure openings before allowing them to return to their undeformed shape as they emerge on the other side of said base structure such that the grommets are captured in said base structure openings with their heads on one side thereof, their bodies on the other side thereof, and their necks disposed therein; and
    engaging a push rod which is attached to said common pushing element, against said base structure one side at substantially the same time that said grommet heads emerge on said base structure other side, to lift said base structure off said cylinder discharge openings.

* * * * *